(12) United States Patent
Curran

(10) Patent No.: US 12,126,649 B2
(45) Date of Patent: *Oct. 22, 2024

(54) SCAN ENGINE EXTENSION FOR CUSTOMIZING APPLICATION SECURITY TESTING BEHAVIOR

(71) Applicant: Rapid7, Inc., Boston, MA (US)

(72) Inventor: Barry Curran, Belfast (GB)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,496

(22) Filed: Jan. 9, 2024

(65) Prior Publication Data
US 2024/0146763 A1     May 2, 2024

Related U.S. Application Data

(63) Continuation of application No. 17/365,171, filed on Jul. 1, 2021, now Pat. No. 11,909,764.

(51) Int. Cl.
*H04L 9/40*     (2022.01)

(52) U.S. Cl.
CPC ...... *H04L 63/1466* (2013.01); *H04L 63/0807* (2013.01); *H04L 63/1433* (2013.01); *H04L 63/20* (2013.01)

(58) Field of Classification Search
CPC . H04L 63/1466; H04L 63/20; H04L 63/0807; H04L 63/133
USPC ......................................................... 726/23
See application file for complete search history.

(56) References Cited

U.S. PATENT DOCUMENTS

| | | | | |
|---|---|---|---|---|
| 7,023,861 | B2* | 4/2006 | Makinson | H04L 63/145 713/153 |
| 8,595,170 | B2* | 11/2013 | Gladstone | G06F 21/62 715/741 |
| 10,701,097 | B2* | 6/2020 | Madou | G06F 11/3692 |
| 2008/0086773 | A1* | 4/2008 | Tuvell | G06F 21/55 726/23 |
| 2011/0083176 | A1* | 4/2011 | Martynenko | G06F 21/56 726/13 |
| 2011/0296525 | A1* | 12/2011 | Turbin | G06F 21/566 726/23 |

(Continued)

*Primary Examiner* — Teshome Hailu
(74) *Attorney, Agent, or Firm* — Ashwin Anand; Lei Sun

(57) ABSTRACT

Various embodiments include implementing an interceptor for application security testing. The interceptor may intercept traffic, including one or more traffic items, between a scan engine and a target application. The traffic item(s) may include a request directed to the target application from a scan engine implementing application security testing or a response from the target application responsive to request(s) from the scan engine. The interceptor may determine that a particular traffic item satisfies a particular traffic trigger associated with a particular traffic action comprising a manipulation to the traffic between the scan engine and the target application. The particular traffic action is one of a plurality of predefined traffic actions that the interceptor is configured to perform across different scan engine versions, different scan configurations, or both. Responsive to determining that the particular traffic item satisfies the particular traffic trigger, the interceptor may perform the particular traffic action.

20 Claims, 7 Drawing Sheets

(56) References Cited

U.S. PATENT DOCUMENTS

2013/0042294 A1* 2/2013 Colvin ............... G06F 21/6218
726/1

* cited by examiner

… … …

SCAN ENGINE EXTENSION FOR CUSTOMIZING APPLICATION SECURITY TESTING BEHAVIOR

This Application claims priority under 35 U.S.C. § 120 and is a continuation of U.S. patent application Ser. No. 17/365,171 filed Jul. 1, 2021, titled "MAN-IN-THE-MIDDLE INTERCEPTOR FOR APPLICATION SECURITY TESTING" the entire contents of which are incorporated herein by reference in its entirety.

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities.

A man-in-the-middle (MITM) attack is a cyberattack where the attacker secretly relays and possibly alters the communications between two parties who believe that they are directly communicating with each other. There is a need for improved systems and methods of proactive testing to identify potential vulnerabilities to such cyberattacks.

SUMMARY OF EMBODIMENTS

The systems and methods described herein may be employed in various combinations and in embodiments to implement a man-in-the-middle interceptor (referred to herein as "interceptor") for application security testing. While the interceptor of the present disclosure acts as a third party, checking and potentially altering communications in a manner that may contain similarities to a man-in-the-middle attack, it should be noted that the interceptor of the present disclosure is not intended to be used to carry out such attacks or to protect against this particular class of cyberattacks directly. Various benefits associated with the interceptor of the present disclosure may include scalability, extensibility and responsiveness. With regard to scalability, the interceptor of the present disclosure may provide the ability to listen to and manipulate communications between any number of engines and applications. With regard to extensibility, by working at the level of HTTP requests and responses, the interceptor of the present disclosure may allow for various customizations. With regard to responsiveness, as the interceptor of the present disclosure monitors traffic as it moves between scan engines and target applications, it is possible to create dynamic rules and integrations that operate as an individual scan runs (instead of being limited to data that is present before or after the scan runs).

Figure 1:
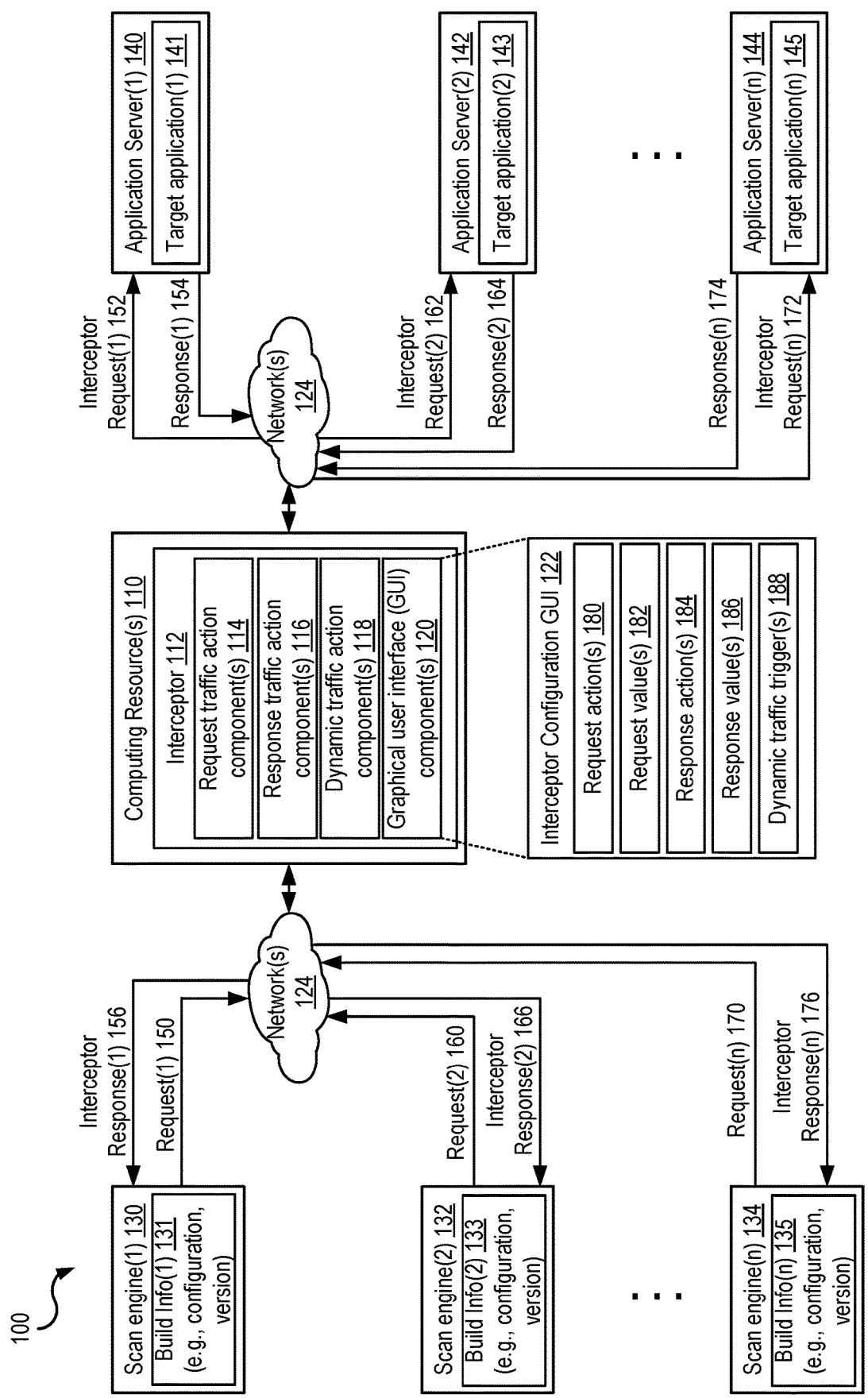
FIG. 1 is a block diagram illustrating an example system that implements an interceptor for application security testing, in accordance with some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure describes a man-in-the-middle interceptor for dynamic application security test (DAST) scanning. In the system of the present disclosure, a protocol (e.g., HTTP) interceptor (also referred to herein as an "interceptor") is paired with logic that makes it easier to modify the behavior of DAST scans and integrate DAST scans with other systems.

During a DAST scan, a scan engine sends HTTP requests to a target application, and the application server in turn sends back HTTP responses to the scan engine. One aspect of the present disclosure includes an interceptor positioned between the scan engine and the application server. The interceptor may capture traffic as it moves between the scan engine and the application server and may be programmable to allow users to design various custom operations. To illustrate, a user may design custom operation(s) following a workflow that includes: choosing whether an action requires data from the requests or responses; defining some value (or range of values) to match in the request or response; and outlining an action to take when the value (or range of values) is found.

As an example, the action could be enforcing rules to decide what data should be allowed through. As another example, the action could be modifying the data in useful ways. As yet another example, the action could allow for integrations and automated workflows that trigger based on the live behavior of the engine and server, rather than the data generated before the scan runs or after it is completed.

Various benefits associated with taking the approach of the present disclosure instead of an on-engine solution include scalability, extensibility and responsiveness. With regard to scalability, the present disclosure provides the ability to have the interceptor listen to and manipulate communications between any number of engines and applications. In some cases, the interceptor may apply such manipulations uniformly to all engine builds and configurations, allowing for highly centralized control. With regard to extensibility, working at the level of the HTTP requests and responses allows for various customizations, as described further herein. With regard to responsiveness, as the interceptor monitors traffic as it moves between a scan engine and a target application, it is possible to create dynamic rules and integrations that operate as the scan runs (instead of being limited to data that is present before or after the scan runs).

An on-engine approach to dynamic application security testing involves users defining rules that apply to a particular scan or engine. By contrast, the interceptor of the present disclosure may apply rules across any number of scans on groups of engines, or the interceptor of the present disclosure may apply rules across a single engine in a way that is also agnostic to the engine builds involved. Accordingly, the interceptor of the present disclosure may be used to replicate features of later engine builds on older builds, such as fixes to attack strings or performance controls. The interceptor of the present disclosure is a programmable interceptor that provides several additional advantages compared to on-engine approaches.

One advantage is that the interceptor of the present disclosure may be programmed to change the rate of requests. To illustrate, the interceptor could examine the content or timing of responses and slow the rate of requests in order to avoid overburdening an application server. Alternatively, the interceptor may be programmed to increase the rate of requests (e.g., up to a scan engine's maximum output) to achieve faster scan times.

Another advantage is that the interceptor of the present disclosure may be programmed to change request data. As an example, the interceptor may identify a response as having an expired session token. In this case, the interceptor may perform the authentication and then instruct a scan engine to use a new token for future requests. As another example, a response may be indicative of a target application being in an error state, which may adversely affect the scan. In this case, the interceptor may identify this error state and exclude similar requests in current and/or future scans.

Yet another advantage is that the interceptor of the present disclosure may be programmed to enable live custom integrations. To illustrate, the interceptor may analyze the same responses as the scan engine and trigger events before the scan has finished. For example, the interceptor may send notifications upon discovery of new vulnerabilities. As another example, the interceptor may send notifications that include findings which are above a certain severity threshold or were previously reported as remediated. Additionally, the interceptor may maintain audit logs, which may be provided to third party systems. As such data is captured in real-time, these audit logs would persist even if the application or engine were brought down by the scan.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements an interceptor 112 for dynamic application security test (DAST) scanning, in accordance with some embodiments. The particular embodiment depicted in FIG. 1 is designed to illustrate various benefits associated with the interceptor 112, including scalability, extensibility and responsiveness. With regard to scalability, FIG. 1 illustrates that the interceptor 112 may provide the ability to listen to and manipulate communications between any number of engines and applications. With regard to extensibility, FIG. 1 illustrates that, by working at the level of HTTP requests and responses, the interceptor 112 may allow for various customizations. With regard to responsiveness, FIG. 1 illustrates that, as the interceptor 112 monitors traffic as it moves between scan engines and target applications, it is possible to create dynamic rules and integrations that operate as an individual scan runs (instead of being limited to data that is present before or after the scan runs).

Figure 7:
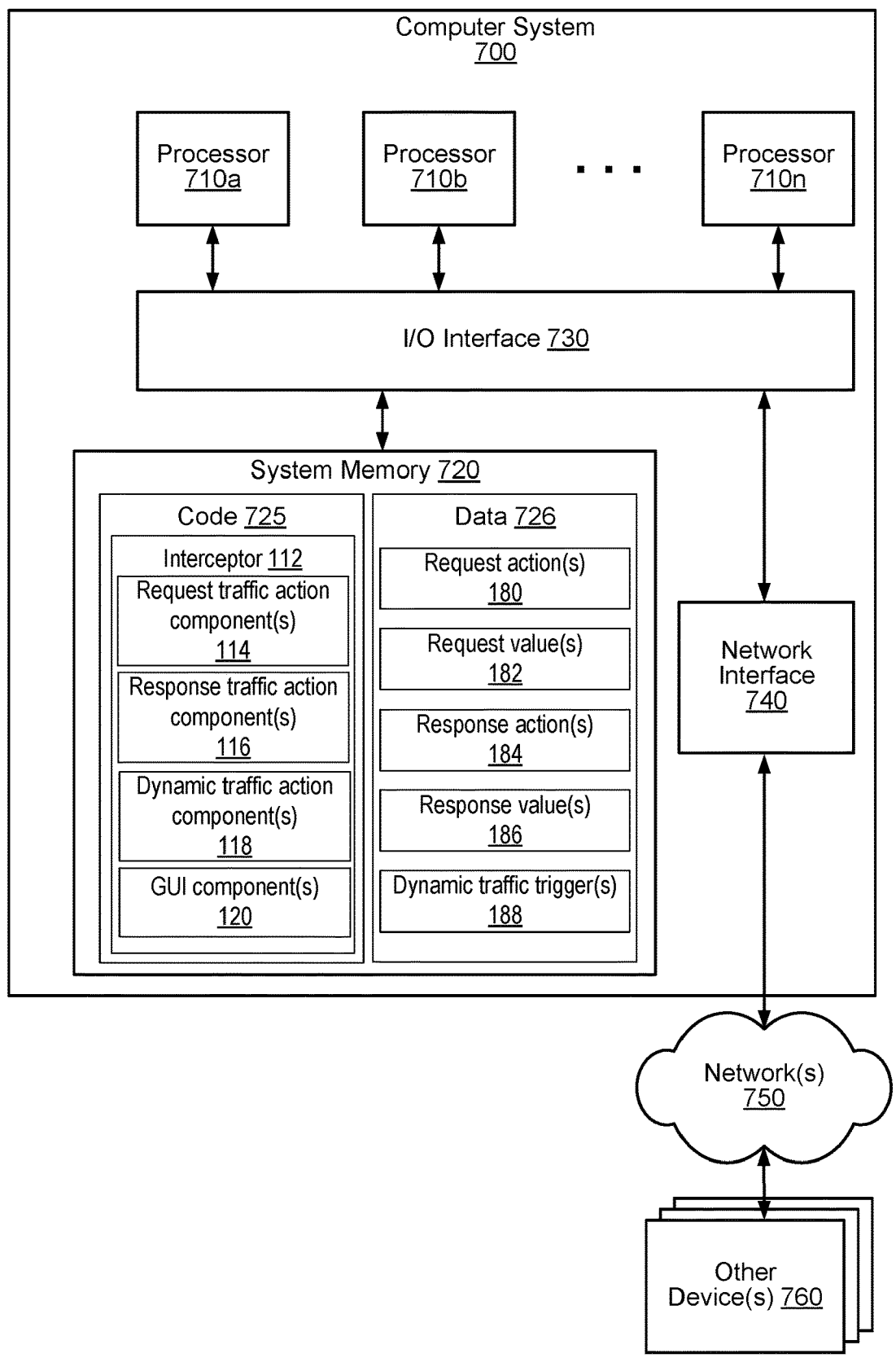
FIG. 7 is a block diagram illustrating an example computer system that may be used to implement one or more portions of a system that implements an interceptor for application security testing, according to some embodiments.

FIG. 1 depicts one or more computing resources 110, which may include one or more hardware processors with associated memory (not shown, see e.g. FIG. 7). The computing resource(s) 110 may be configured to implement the interceptor 112 that may be utilized as an HTTP interceptor for DAST scanning. FIG. 1 further illustrates that the computing resource(s) 110 may be configured to implement multiple components associated with various features of the interceptor 112.

In the embodiment depicted in FIG. 1, the interceptor 112 includes one or more request traffic action components 114, one or more response traffic action components 116, one or more dynamic traffic action components 118, and one or more graphical user interface (GUI) components 120. The request traffic action component(s) 114 may be configured to perform one or more request traffic actions (i.e., on traffic from engine to application). The response traffic action component(s) 116 may be configured to perform one or more response traffic actions (i.e., on traffic from application to engine). The dynamic traffic action component(s) 118 may be configured to perform one or more dynamic traffic actions, as further described herein. The GUI component(s) 120 may be configured to generate one or more GUIs, such as the representative interceptor configuration GUI 122 depicted in FIG. 1. FIG. 1 illustrates that the interceptor 112 is positioned as a proxy to intercept traffic between engines and applications via one or more networks 124.

FIG. 1 illustrates that, in some embodiments, multiple scan engines may utilize the interceptor 112 as a proxy. In the embodiment depicted in FIG. 1, the multiple scan engines include a first scan engine 130 and a second scan engine 132, up to an nth scan engine 134. As each of the scan engines 130, 132, and 134 utilizes the interceptor 112 as a proxy, one advantage associated with the interceptor 112 is scalability. That is, the interceptor 112 may listen to and manipulate communications between any number of engines and applications in a way that is uniform across all engine versions and scan configurations. For example, FIG. 1 illustrates that first build information 131 is associated with the first scan engine 130, second build information 133 is associated with the second scan engine 132, and nth build information 135 is associated with the nth scan engine 134.

The first build information 131 may indicate that the first scan engine 130 has a first engine version and scan configuration. The second build information 133 may indicate that the second scan engine 132 has a second engine version and scan configuration. The nth build information 135 may indicate the nth scan engine 134 has an nth engine version and scan configuration. That is, each of scan engines 130, 132, and 134 may have different engine versions and/or scan configurations. In contrast to on-engine approaches to dynamic application security testing which involves users defining rules that apply to a particular scan or engine, the interceptor 112 may apply rules across any number of scans on groups of engines, or the interceptor 112 may apply rules across a single engine in a way that is also agnostic to the engine builds involved. Accordingly, the interceptor 112 may be used to replicate features of later engine builds on older builds, such as fixes to attack strings or performance controls.

FIG. 1 illustrates an example in which the interceptor 112 is configured to communicate with different application servers that host different target applications via the network(s) 124. In the embodiment depicted in FIG. 1, the multiple application servers include: a first application server 140 associated with a first target application 141 and a second application server 142 associated with a second target application 143, up to an nth application server 144 associated with an nth target application 145. The first target application 141 may correspond to one target application on which the first scan engine 130 performs a DAST scan. The second target application 143 may correspond to another target application on which the second scan engine 132 performs a DAST scan. The nth target application 145 may correspond to another target application on which the nth scan engine 134 performs a DAST scan.

FIG. 1 illustrates that the interceptor 112 is configured to receive a first request 150 from the first scan engine 130 via the network(s) 124. The first request 150 may be directed to the first target application 141 associated with the first application server 140. The interceptor 112 is configured to generate a first interceptor request 152 and to communicate the first interceptor request 152 to the first target application 141 at the first application server 140 via the network(s) 124. Responsive to receiving the first interceptor request 152, the first target application 141 is configured to generate a first response 154 and to communicate the first response 154 to the interceptor 112 via the network(s) 124. Responsive to receiving the first response 154, the interceptor 112 is configured to generate a first interceptor response 156 and to communicate the first interceptor response 156 to the first scan engine 130 via the network(s) 124. In some embodiments, the interceptor 112 may utilize the request traffic action component(s) 114 to perform one or more request traffic actions (e.g., actions on traffic from the first scan engine 130 to the first target application 141), as illustrated and further described herein with respect to FIG. 2. In some embodiments, the interceptor 112 may utilize the response traffic action component(s) 116 to perform one or more response traffic actions (e.g., actions on traffic from the first target application 141 to the first scan engine 130), as illustrated and further described herein with respect to FIG. 3. In some embodiments, the interceptor 112 may utilize the dynamic traffic action component(s) 118 to perform one or more dynamic traffic actions on traffic originating from the first scan engine 130, traffic originating from the first target application 141, or a combination thereof.

FIG. 1 further illustrates that the interceptor 112 is configured to receive a second request 160 from the second scan engine 132 via the network(s) 124. The second request 160 may be directed to the second target application 143 associated with the second application server 142. The interceptor 112 is configured to generate a second interceptor request 162 and to communicate the second interceptor request 162 to the second target application 143 at the second application server 142 via the network(s) 124. Responsive to receiving the second interceptor request 162, the second target application 143 is configured to generate a second response 164 and to communicate the second response 164 to the interceptor 112 via the network(s) 124. Responsive to receiving the second response 164, the interceptor 112 is configured to generate a second interceptor response 166 and to communicate the second interceptor response 166 to the second scan engine 132 via the network(s) 124. In some embodiments, the interceptor 112 may utilize the request traffic action component(s) 114 to perform one or more request traffic actions (e.g., actions on traffic from the second scan engine 132 to the second target application 143). In some embodiments, the interceptor 112 may utilize the response traffic action component(s) 116 to perform one or more response traffic actions (e.g., actions on traffic from the second target application 143 to the second scan engine 132). In some embodiments, the interceptor 112 may utilize the dynamic traffic action component(s) 118 to perform one or more dynamic traffic actions on traffic originating from the second scan engine 132, traffic originating from the second target application 143, or a combination thereof.

FIG. 1 further illustrates that the interceptor 112 is configured to receive an nth request 170 from the nth scan engine 134 via the network(s) 124. The nth request 170 may be directed to the nth target application 145 associated with the nth application server 144. The interceptor 112 is configured to generate an nth interceptor request 172 and to communicate the nth interceptor request 172 to the nth target application 145 at the nth application server 144 via the network(s) 124. Responsive to receiving the nth interceptor request 172, the nth target application 145 is configured to generate an nth response 174 and to communicate the nth response 174 to the interceptor 112 via the network(s) 124. Responsive to receiving the nth response 174, the interceptor 112 is configured to generate an nth interceptor response 176 and to communicate the nth interceptor response 176 to the nth scan engine 134 via the network(s) 124. In some embodiments, the interceptor 112 may utilize the request traffic action component(s) 114 to perform one or more request traffic actions (e.g., actions on traffic from the nth scan engine 134 to the nth target application 145). In some embodiments, the interceptor 112 may utilize the response traffic action component(s) 116 to perform one or more response traffic actions (e.g., actions on traffic from the nth target application 145 to the nth scan engine 134). In some embodiments, the interceptor 112 may utilize the dynamic traffic action component(s) 118 to perform one or more dynamic traffic actions on traffic originating from the nth scan engine 134, traffic originating from the nth target application 145, or a combination thereof.

FIG. 1 illustrates that the GUI component(s) 120 may be configured to generate one or more GUIs, such as the interceptor configuration GUI 122. The interceptor configuration GUI 122 depicted in FIG. 1 is a simplified example to illustrate that various user criteria may be utilized for configuring (or "programming") the interceptor 112. To illustrate, the interceptor configuration GUI 122 may allow a user to specify one or more request actions 180 that may be associated with a particular configuration of the request traffic action component(s) 114. The interceptor configuration GUI 122 may allow a user to specify one or more request values 182 that may be associated with a particular configuration of the request traffic action component(s) 114. The interceptor configuration GUI 122 may allow a user to specify one or more response actions 184 that may be associated with a particular configuration of the response traffic action component(s) 116. The interceptor configuration GUI 122 may allow a user to specify one or more response values 186 that may be associated with a particular configuration of the response traffic action component(s) 116. In the particular embodiment depicted in FIG. 1, the interceptor configuration GUI 122 may allow a user to specify one or more dynamic traffic triggers 188 that may be associated with a particular configuration of the dynamic traffic action component(s) 118. Thus, the interceptor 112 of FIG. 1 is a programmable interceptor that provides several additional advantages compared to on-engine approaches.

One advantage is that the interceptor 112 may be programmed to change the rate of requests. To illustrate, the interceptor 112 could examine the content or timing of responses and slow the rate of requests in order to avoid overburdening a particular application server. Alternatively, the interceptor 112 may be programmed to increase the rate of requests (e.g., up to a scan engine's maximum output) to achieve faster scan times.

Another advantage is that the interceptor 112 may be programmed to change request data. As an example, the interceptor 112 may identify a response as having an expired session token. In this case, the interceptor 112 may perform the authentication and then instruct a particular scan engine to use a new token for future requests. As another example, a response may be indicative of a particular target application being in an error state, which may adversely affect the scan. In this case, the interceptor 112 may identify this error state and exclude similar requests in current and/or future scans.

Yet another advantage is that the interceptor 112 may be programmed to enable live custom integrations. To illustrate, the interceptor 112 may analyze the same response(s) as the scan engine(s) and trigger events before a particular scan has finished. For example, the interceptor 112 may send notifications upon discovery of new vulnerabilities. As another example, the interceptor 112 may send notifications that include findings which are above a certain severity threshold or were previously reported as remediated. Additionally, the interceptor 112 may maintain audit logs, which may be provided to third party systems. As such data is captured in real-time, these audit logs would persist even if a particular application or engine were brought down by the scan.

Thus, FIG. 1 illustrates an example system that implements an interceptor for application security testing. In contrast to on-engine approaches to dynamic application security testing, the interceptor 112 of FIG. 1 may provide various benefits including scalability, extensibility and responsiveness.

Figure 2:
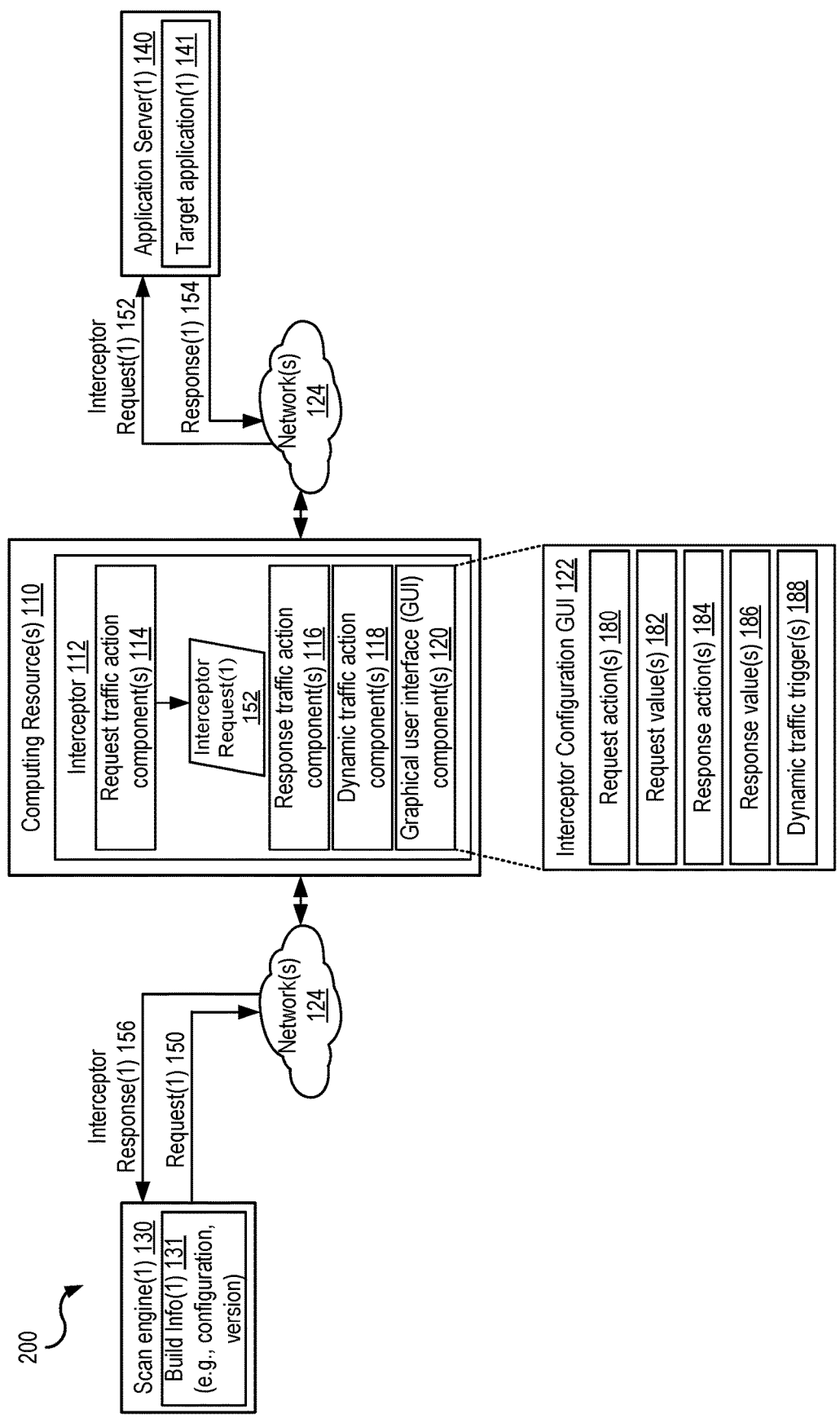
FIG. 2 is a block diagram illustrating an example process of utilizing the interceptor of FIG. 1 to perform request traffic actions, in accordance with some embodiments.

FIG. 2 is a block diagram 200 illustrating an example process of utilizing the interceptor 112 of FIG. 1 to perform one or more request traffic actions, according to some embodiments.

FIG. 2 illustrates that, in some embodiments, the interceptor 112 may utilize the request traffic action component(s) 114 to perform one or more request traffic actions. In the simplified example depicted in FIG. 2, the interceptor 112 utilizes the request traffic action component(s) 114 to perform request traffic operations on traffic from the first scan engine 130 to the first target application 141. While not shown in FIG. 2, it will be appreciated that the interceptor 112 may utilize the request traffic action component(s) 114 to perform similar request traffic action operations on traffic from the other scan engines depicted in FIG. 1. That is, the interceptor 112 may utilize the request traffic action component(s) 114 to perform similar request traffic operations on traffic from the second scan engine 132 to the second target application 143 and/or on traffic from the nth scan engine 134 to the nth target application 145.

In some embodiments, the interceptor 112 may utilize the request traffic action component(s) 114 to perform one or more blocking actions on traffic originating from the first scan engine 130. As an example, some attacks may be known to damage certain applications or may be known to cause false positives. In such cases, the interceptor 112 may determine that the first request 150 has characteristics associated with such attacks and may utilize the request traffic action component(s) 114 to block such attacks from reaching the target application server (e.g., the first application server 140). Specifically, the request traffic action component(s) 114 may generate the first interceptor request 152 by modifying the first request 150 accordingly or the request traffic action component(s) 114 may completely block the first request 150 from reaching the first application server 140. As another example, some directories may be known to cause problems, such as pages that send notifications or administrator panels. In such cases, the interceptor 112 may determine that the first request 150 identifies such directories and may utilize the request traffic action component(s) 114 to exclude such directories from crawling. Specifically, the request traffic action component(s) 114 may generate the first interceptor request 152 by modifying the first request 150 to exclude such directories from crawling.

In some embodiments, the interceptor 112 may utilize the request traffic action component(s) 114 to perform one or more modifying actions on traffic originating from the first scan engine 130. As an example, the first request 150 from the first scan engine 130 may include parameters that utilize random values. In such cases, the request traffic action component(s) 114 may replace such random values with known values to improve crawl coverage. Specifically, the request traffic action component(s) 114 may generate the first interceptor request 152 by modifying the first request 150 to replace such random values with known product or user identifiers or with known application-specific values (associated with the first target application 141). As another example, the request traffic action component(s) 114 may generate the first interceptor request 152 by modifying the first request 150 to update header information to avoid web application firewall (WAF) filters. As another example, the request traffic action component(s) 114 may generate the first interceptor request 152 by modifying the first request 150 to include a unique header identifier value. The unique header identifier value may track features of the first request 150 like the originating engine (e.g., the first scan engine 130), the interceptor used (e.g., the interceptor 112), or the attack presently being performed. Such information may be useful for subsequent analysis and integration. As yet another example, the request traffic action component(s) 114 may generate the first interceptor request 152 by modifying the first request 150 to redirect traffic bound for one server to another address to account for changing hosts in pre-production environments.

Thus, FIG. 2 illustrates an example process of utilizing the interceptor 112 of the present disclosure to perform various request traffic actions. In contrast to on-engine approaches to dynamic application security testing, FIG. 2 illustrates that the interceptor 112 may provide various benefits including scalability, extensibility and responsiveness.

Figure 3:
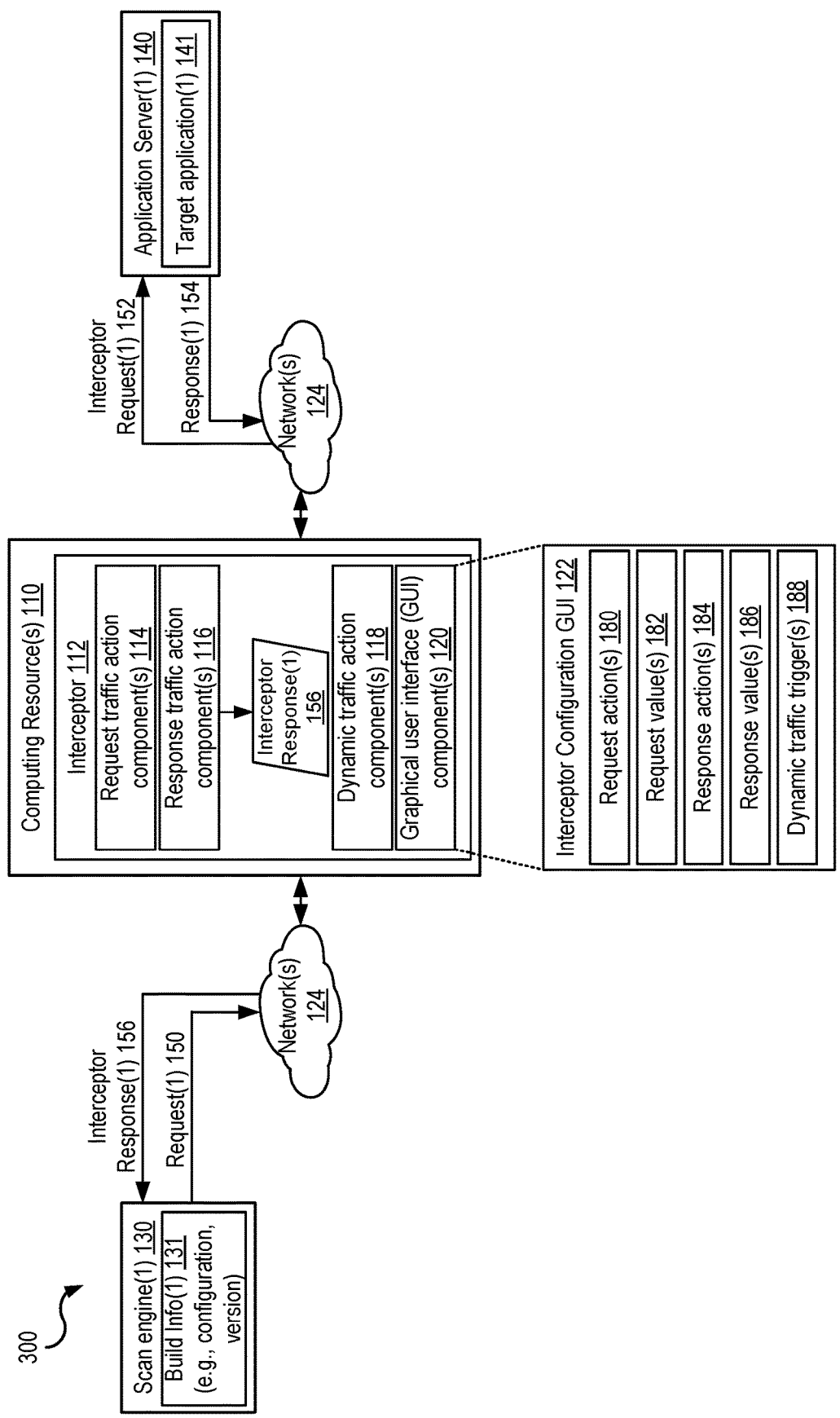
FIG. 3 is a block diagram illustrating an example process of utilizing the interceptor of FIG. 1 to perform response traffic actions, in accordance with some embodiments.

FIG. 3 is a block diagram 300 illustrating an example process of utilizing the interceptor 112 of FIG. 1 to perform one or more response traffic actions, according to some embodiments.

FIG. 3 illustrates that, in some embodiments, the interceptor 112 may utilize the response traffic action component(s) 116 to perform one or more response traffic actions. In the simplified example depicted in FIG. 3, the interceptor 112 utilizes the response traffic action component(s) 116 to perform response traffic operations on traffic from the first target application 141 to the first scan engine 130. While not shown in FIG. 2, it will be appreciated that the interceptor 112 may utilize the response traffic action component(s) 116 to perform similar response traffic operations on traffic from the other target applications depicted in FIG. 1. That is, the interceptor 112 may utilize the response traffic action component(s) 116 to perform similar response traffic operations on traffic from the second target application 143 to the second scan engine 132 and/or on traffic from nth target application 145 to the nth scan engine 134.

As one example, the interceptor 112 may utilize the response traffic action component(s) 116 to dynamically adapt the behavior of the first scan engine 130 to better perform scanning tasks. This may allow for various behaviors not possible using on-engine scan configuration options, such as changing the rate of requests, changing request data, or custom integrations.

As an example of changing the rate of requests, the interceptor 112 may examine the content or timing of responses (e.g., the first response 154) from the first application server 140 so as to avoid overburdening the first application server 140. Specifically, in some cases, the response traffic action component(s) 116 may generate the first interceptor response 156 to provide such reduced request rate information to the first scan engine 130. As another example, it may also be possible to increase the rate of requests (e.g., up to a maximum output of the first scan engine 130) in order to achieve faster scan times. Specifically, in some cases, the response traffic action component(s) 116 may generate the first interceptor response 156 to provide such increased request rate information to the first scan engine 130.

As an example of changing request data, the interceptor 112 may examine the first response 154 from the first application server 140 and identify the first response 154 as indicating an expired session token. In such cases, the interceptor 112 may perform the authentication and then instruct the first scan engine 130 to use a new token for future requests. Specifically, in some cases, the response traffic action component(s) 116 may generate the first interceptor response 156 to include information instructing the first scan engine 130 to use a new token for subsequent requests. As another example, the interceptor 112 may examine the first response 154 from the first application server 140 and determine that the first target application 141 is in an error state which would adversely affect the scan. In such cases, the interceptor 112 may exclude similar requests in the current and subsequent scans. Specifically, in some cases, the response traffic action component(s) 116 may generate the first interceptor response 156 to include information instructing the first scan engine 130 to exclude similar requests based on the error state.

As an example of custom integrations, the interceptor 112 may analyze the first response 154 from the first application server 140 in a manner similar to the first scan engine 130 and trigger event(s) before the scan has finished. For example, the interceptor 112 may send notifications upon discovery of new vulnerabilities, or the interceptor 112 may send notifications regarding findings which are above a certain severity threshold or were previously reported as remediated. In some embodiments, the response traffic action component(s) 116 may be configured to include such notification capabilities. As another example of custom integrations, the interceptor 112 may maintain audit logs (not shown in FIG. 3) that could be kept and sent to third party systems. As the interceptor 112 captures such data in real-time, these audit logs would persist even if the first target application 141 or the first scan engine 130 were brought down by the scan.

Thus, FIG. 3 illustrates an example process of utilizing the interceptor 112 of the present disclosure to perform various response traffic actions. In contrast to on-engine approaches to dynamic application security testing, FIG. 3 illustrates that the interceptor 112 may provide various benefits including scalability, extensibility and responsiveness.

Figure 4:
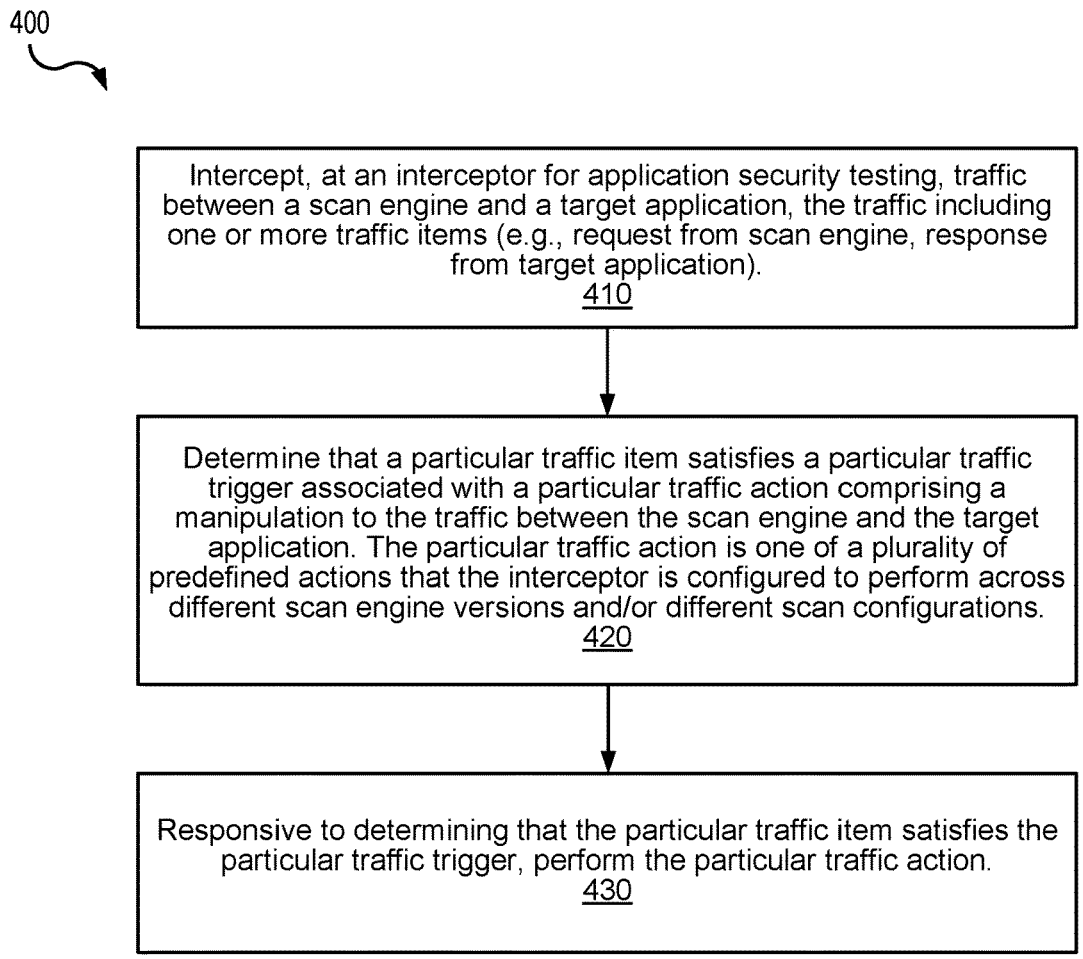
FIG. 4 is a flowchart that illustrates an example process of utilizing an interceptor for application security testing, according to some embodiments.

FIG. 4 is a flowchart 400 that illustrates an example of a process of utilizing an interceptor for application security testing, according to some embodiments. As previously described herein, the interceptor of the present disclosure may be configured to perform traffic actions across different scan engine versions and/or different scan configurations.

At operation 410, the process includes intercepting, at an interceptor for application security testing, traffic between a scan engine and a target application. The traffic may include one or more traffic items comprising at least one of: a request from a scan engine implementing application security testing, where the request is directed to the target application; or a response from the target application via a target application server, where the response is responsive to one or more requests from the scan engine implementing the application security testing. For example, referring to FIG. 1, the computing resource(s) 110 may include hardware processor(s) with associated memory that implement the interceptor 112 for application security testing. The interceptor 112 is configured to intercept traffic between each of the scan engines 130, 132, 134 and each of the target applications 141, 143, 145. Each of the requests 150, 160, 170 represent examples of requests from a particular scan engine implementing application security testing. To illustrate, the first request 150 corresponds to a request from the first scan engine 130 that is directed to the first target application 141. The second request 160 corresponds to a request from the second scan engine 132 that is directed to the second target application 143, and the nth request 170 corresponds to a request from the nth scan engine 134 that is directed to the nth target application 145. Each of the responses 154, 164, 174 represent examples of responses from each of the target applications 141, 143, 145 via the target application servers 140, 142, 144. Further, each of the responses 154, 164, 174 are responsive to request(s) from the associated scan engines 130, 132, 134 implementing the application security testing. To illustrate, the first response 154 corresponds to a response from the first target application 141 (at the first application server 140) that is responsive to the first request 150 from the first scan engine 130. The second response 164 corresponds to a response from the second target application 143 (at the second application server 142) that is responsive to the second request 160 from the second scan engine 132, and the nth response 174 corresponds to a response from the nth target application 145 (at the nth application server 144) that is responsive to the nth request 170 from the nth scan engine 134.

At operation 420, the process includes determining that a particular traffic item of the one or more traffic items satisfies a particular traffic trigger associated with a particular traffic action comprising a manipulation to the traffic between the scan engine and the target application. The particular traffic action is one of a plurality of predefined traffic actions that the interceptor is configured to perform across different scan engine versions, different scan configurations, or both. For example, referring to FIG. 1, the interceptor 112 is configured to perform various traffic actions across different scan engine versions, different scan configurations, or both. To illustrate, the first scan engine 130 has first build information 131 that may represent a first scan engine version and a first scan configuration. The second scan engine 132 has second build information 133 that may represent a second scan engine version and a second scan configuration. In some cases, the first scan engine version may be different from the second scan engine version. Alternatively or additionally, in some cases, the first scan configuration may be different from the second scan configuration. Similarly, the nth scan engine 134 has nth build information 135 that may represent a different scan engine version, a different scan configuration, or both.

At operation 430, the process includes performing the particular traffic action responsive to determining that the particular traffic item satisfies the particular traffic trigger. For example, referring to FIG. 1, the request traffic action component(s) 114 of the interceptor 112 may be configured to perform various predefined traffic actions that include manipulating request traffic from the individual scan engines 130, 132, 134 that is directed to the individual target applications 141, 143, 145. To illustrate, responsive to satisfying a particular traffic trigger, the request traffic action component(s) 114 may manipulate the first request 150 to generate the first interceptor request 152 that is sent to the first target application 141. Responsive to satisfying particular traffic trigger(s), the request traffic action component(s) 114 may manipulate the second request 160 to generate the second interceptor request 162 that is sent to the second target application 143, and request traffic action component(s) 114 may manipulate the nth request 170 to generate the nth interceptor request 172 that is sent to the nth target application 145. As another example, referring to FIG. 1, the response traffic action component(s) 116 of the interceptor 112 may be configured to perform various predefined traffic actions that includes manipulating response traffic from the individual target applications 141, 143, 145 that is directed to the individual scan engines 130, 132, 134. To illustrate, responsive to satisfying a particular traffic trigger, the response traffic action component(s) 116 may manipulate the first response 154 to generate the first interceptor response 156 that is sent to the first scan engine 130. Responsive to satisfying particular traffic trigger(s), the response traffic action component(s) 116 may manipulate the second response 164 to generate the second interceptor response 166 that is sent to the second scan engine 132, and the response traffic action component(s) 116 may manipulate the nth response 174 to generate the nth interceptor response 176 that is sent to the nth scan engine 134.

Thus, FIG. 4 illustrates an example of a process of utilizing the interceptor of the present disclosure for application security testing. In contrast to on-engine approaches to dynamic application security testing, the interceptor of the present disclosure may provide various benefits including scalability, extensibility and responsiveness.

Figure 5:
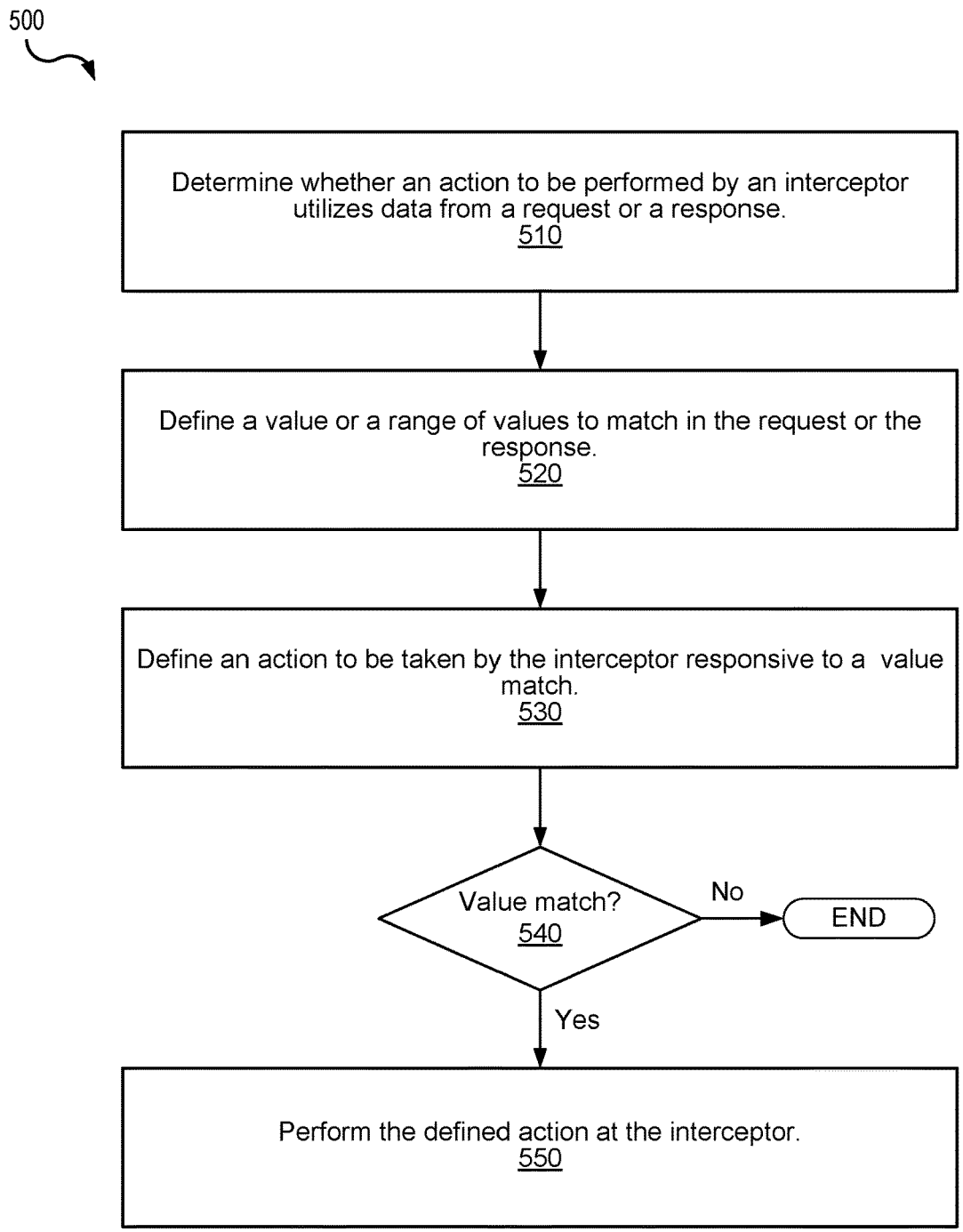
FIG. 5 is a flowchart that illustrates an example process of utilizing an interceptor to perform an action according to a user-defined workflow for application security testing, according to some embodiments.

FIG. 5 is a flowchart 500 that illustrates an example of a process of utilizing an interceptor to perform an action according to a user-defined workflow for application security testing, according to some embodiments.

At operation 510, the process includes determining whether an action to be performed by an interceptor utilizes data from a request or a response. For example, referring to FIG. 1, the interceptor 112 may receive information from the interceptor configuration GUI 122 that may be utilized to make the determination. In some cases, the interceptor 112 may receive information related to one or more request actions 180 that is provided via the interceptor configuration GUI 122. In such cases, the interceptor 112 may determine that the action to be performed utilizes data from a request. In other cases, the interceptor 112 may receive information related to one or more response actions 184 that is provided via the interceptor configuration GUI 122. In such cases, the interceptor 112 may determine that the action to be performed utilizes data from a response.

At operation 520, the process includes defining a value or a range of values to match in the request or response. For example, referring to FIG. 1, the interceptor 112 may receive information from the interceptor configuration GUI 122 that may be utilized in order to match value(s) in the request or response. In some cases, the interceptor 112 may receive information related to one or more request values 182 that is provided via the interceptor configuration GUI 122. The request value(s) 182 may correspond to a particular request value or a range of request values. In such cases, the interceptor 112 may determine that one or more request values received from one or more of the scan engines 130, 132, 134 is to be compared to the request value(s) 182 to identify a match. In other cases, the interceptor 112 may receive information related to one or more response values 186 that is provided via the interceptor configuration GUI 122. The response value(s) 186 may correspond to a particular response value or a range of response values. In such cases, the interceptor 112 may determine that one or more response values received from one or more of the application servers 140, 142, 144 is to be compared to the response value(s) 186 to identify a match.

At operation 530, the process includes defining an action to be taken by the interceptor responsive to a value match. For example, referring to FIG. 1, the interceptor 112 may receive information from the interceptor configuration GUI 122 that may be utilized to determine the action to be taken responsive to a request/response value match. In some cases, the request action(s) 180 provided via the interceptor configuration GUI 122 may define an action to be taken by the interceptor 112 in response to a request value matching the request value(s) 182. In such cases, the interceptor 112 may determine that the defined action is to be taken responsive to one or more request values received from one or more of the scan engines 130, 132, 134 matching the request value(s) 182. In other cases, the response action(s) 184 provided via the interceptor configuration GUI 122 may define an action to be taken by the interceptor 112 in response to a response value matching the response value(s) 186. In such cases, the interceptor 112 may determine that the defined action is to be taken responsive to one or more response values received from one or more of the application servers 140, 142, 144 matching the response value(s) 186.

At operation 540, the process includes determining whether there is a value match. If there is no value match, the process ends. If there is a value match, the process proceeds to operation 550. At operation 550, the process includes performing the defined action at the interceptor. For example, referring to FIG. 1, the interceptor 112 may perform the defined action based on the action information received from the interceptor configuration GUI 122. In cases where the defined action is to be taken responsive to a request value match, the interceptor 112 may perform the defined action responsive to one or more request values received from one or more of the scan engines 130, 132, 134 matching the request value(s) 182. In cases where the defined action is to be taken responsive to a response value match, the interceptor 112 may perform the defined action responsive to one or more response values received from one or more of the application servers 140, 142, 144 matching the response value(s) 186.

Thus, FIG. 5 illustrates an example of a process of utilizing the interceptor of the present disclosure to perform an action according to a user-defined workflow for application security testing.

Figure 6:
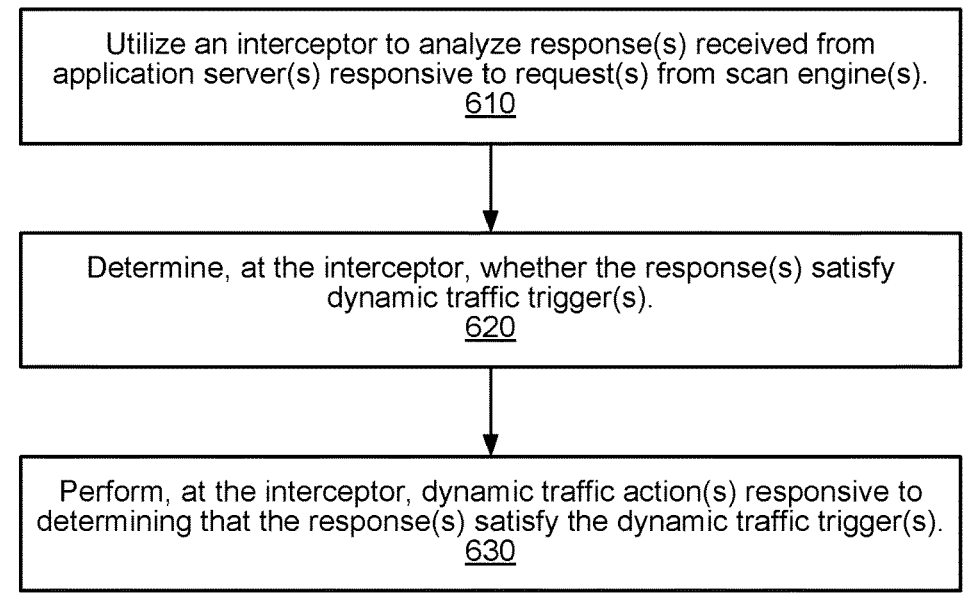
FIG. 6 is a flowchart that illustrates an example process of utilizing an interceptor to perform a dynamic traffic action according to dynamic traffic triggers, according to some embodiments.

FIG. 6 is a flowchart 600 that illustrates an example of a process of utilizing an interceptor to perform one or more dynamic traffic actions according to one or more dynamic traffic triggers, according to some embodiments.

At operation 610, the process includes utilizing an interceptor to analyze response(s) received from application server(s) responsive to request(s) from scan engine(s). As an illustrative example, referring to FIG. 2, the interceptor 112 may analyze the first response 154 received from the first application server 140 responsive to the first request 150 from the first scan engine 130. As previously described herein with respect to FIG. 2, the interceptor 112 may perform a similar analysis of other responses received from other application servers (e.g., the second response 164 from the second application server 142 and/or the nth response 174 from the nth application server 144, as depicted in FIG. 1).

At operation 620, the process includes determining, at the interceptor, whether the response(s) satisfy dynamic traffic trigger(s). For example, referring to FIG. 2, the interceptor 112 may determine whether the first response 154 satisfies the dynamic traffic trigger(s) 188 received via the interceptor configuration GUI 122. As previously described herein with respect to FIG. 2, the interceptor 112 may perform a similar determination for other responses received from other application servers (e.g., the second response 164 from the second application server 142 and/or the nth response 174 from the nth application server 144, as depicted in FIG. 1).

At operation 630, the process includes performing, at the interceptor, dynamic traffic action(s) responsive to determining that the response(s) satisfy the dynamic traffic trigger(s). For example, referring to FIG. 2, the dynamic traffic action component(s) 118 of the interceptor 112 may be utilized to perform one or more dynamic traffic actions responsive to determining that the first response 154 satisfies the dynamic traffic trigger(s) 188. As an example, the dynamic traffic action(s) may include triggering event(s) before the scan performed by the first scan engine 130 has finished. To illustrate, the dynamic traffic action component(s) 118 may send notification(s) upon discovery of new vulnerabilities or findings which are above a certain severity threshold or were previously reported as remediated. As previously described herein with respect to FIG. 2, the dynamic traffic action component(s) 118 of the interceptor 112 may be utilized to perform similar dynamic traffic action(s) responsive to determining that other responses received from other application servers satisfy the dynamic traffic trigger(s) 188 (e.g., the second response 164 from the second application server 142 and/or the nth response 174 from the nth application server 144, as depicted in FIG. 1).

Thus, FIG. 6 illustrates an example of a process of utilizing the interceptor of the present disclosure to perform dynamic traffic action(s) according to dynamic traffic trigger(s).

FIG. 7 is a block diagram illustrating an example computer system 700 that is used to implement one or more portions of a system that implements an interceptor for application security testing, according to some embodiments. For example, the computer system 700 may be a server that implements one or more components of the computing resource(s) 110 of FIG. 1.

Computer system 700 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 700 includes one or more processors 710, which may include multiple cores coupled to a system memory 720 via an input/output (I/O) interface 730. Computer system 700 further includes a network interface 740 coupled to I/O interface 730. In some embodiments, computer system 700 may be a uniprocessor system including one processor 710, or a multiprocessor system including several processors 710a-n, as shown. The processors 710 may be any suitable processors capable of executing instructions. For example, in various embodiments, processors 710 may implement one of a number of instruction set architectures (ISAs), such as the x86, PowerPC, SPARC, or MIPS ISA.

As shown, the computer system 700 may also include one or more network communication devices (e.g., network interface 740) for communicating with other systems and/or components over a communications network. For example, an instance of an application executing on computer system 700 may use network interface 740 to communicate with another server application executing on another computer system, as described herein.

As shown, computer system 700 may use its network interface 740 to communicate with one or more other devices 760, such as persistent storage devices and/or one or more I/O devices. In some embodiments, some of these other devices may be implemented locally on the computer system 700, accessible via the I/O interface 730. In various embodiments, persistent storage devices may include disk drives, tape drives, solid state memory, other mass storage devices, or any other persistent storage device. The computer system 700 may store instructions and/or data in persistent storage devices, and retrieve the stored instruction and/or data as needed.

As shown, the computer system 700 may include one or more system memories 720 that store instructions and data accessible by processor(s) 710. In various embodiments, system memories 720 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 720 may be used to store code 725 or executable instructions to implement the methods and techniques described herein. For example, the executable instructions may include instructions to implement the interceptor 112, including the request traffic action component(s) 114, the response traffic action component(s) 116, the dynamic traffic action component(s) 118, and the GUI component(s) 120, as discussed. The system memory 720 may also be used to store data 726 needed or produced by the executable instructions. For example, the in-memory data 726 may include portions of the request action(s) 180, the request value(s) 182, the response action(s) 184, the response value(s) 186, and the dynamic traffic trigger(s) 188, as discussed.

In some embodiments, some of the code 725 or executable instructions may be persistently stored on the computer system 700 and may have been loaded from external storage media. The persistent storage of the computer system 700 and the external media are examples of non-transitory computer-readable storage media, which may be used to store program instructions to be executed by the computer system 700. A non-transitory computer-readable storage medium may provide the capability to store information in a form readable by a machine (e.g., computer system 700). Non-transitory computer-readable media may include storage media such as magnetic or optical media, disk or DVD/CD-ROM devices, archival tapes, network-attached storage systems, or other computer systems.

In some embodiments, the I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

In some embodiments, the network interface 740 may allow data to be exchanged between computer system 700 and other devices attached to a network. The network interface 740 may also allow communication between computer system 700 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 700 or may be distributed on various nodes of a distributed system that includes computer system 700. In some embodiments, similar input/output devices may be separate from computer system 700 and may interact with one or more nodes of a distributed system that includes computer system 700 through a wired or wireless connection, such as over network interface 740. Network interface 740 may commonly support one or more wireless networking protocols (e.g., Wi-Fi/IEEE 802.11, or another wireless networking standard). In some embodiments, the network interface 740 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
   one or more first computer devices that implement a first scan engine configured to:
      send requests over a network to a target application to perform application security testing on the target application, wherein responses from the target application are analyzed to identify one or more security vulnerabilities of the target application; and
   one or more second computer devices that implement a second scan engine configured to:
      monitor network traffic between the first scan engine and the target application;
      detect that a traffic item in the network traffic satisfies a traffic trigger;
      in response to the detection:
         initiate execution of the custom action configured for the application security testing of the target application; and
         log an indication of the execution of the custom action in an audit log,
      wherein the second scan engine implements an interceptor configured to:
         intercept and regenerate network traffic between the first scan engine and the target application; and
         intercept network traffic among a group of application servers executing the target application and a group of scan engines testing the target application, wherein the group of scan engines includes scan engines of different versions.

2. The system of claim 1, wherein the second scan engine is configurable via a graphical user interface to perform the custom action.

3. The system of claim 1, wherein the custom action modifies a request of the first scan engine or a response of the target application.

4. The system of claim 1, wherein the second scan engine is configured to:
   detect, based on the network traffic, that a session between the test application and the first scan engine has expired; and
   instruct the first scan engine to use a new session token for subsequent requests.

5. The system of claim 4, wherein the second scan engine is configured to:
   perform an authentication process with the test application to obtain the new session token.

6. The system of claim 1, wherein the custom action modifies a rate at which requests are transmitted to the target application.

7. The system of claim 1, wherein second scan engine is configured to:
   detect that the target application is in an error state; and
   instruct the first scan engine to exclude one or more scan requests during the error state.

8. The system of claim 1, wherein the second scan engine is configured to:
   analyze one or more responses from the target application and initiate the custom action based on the analysis of the one or more responses.

9. The system of claim 1, wherein:
   the requests are sent by the first scan engine as part of a scan of the target application; and
   the custom action is initiated by the second scan engine before the scan has finished.

10. The system of claim 1, wherein second scan engine is configured to:
    discover a security vulnerability of the target application based on the network traffic; and
    send a notification to one or more registered computer devices indicating the security vulnerability, prior to completion of the application security testing at the first scan engine.

11. The system of claim 1, wherein the second scan engine is configured to:
    continue to update the audit log after a termination of the first scan engine prior to completion of the application security test.

12. The system of claim 1, wherein the second scan engine is configured to:
    provide at least a portion of the audit log to a third-party system associated with the target application.

13. The system of claim 1, wherein the custom action replicates a new feature implemented by a later scan engine version after the first scan engine.

14. The system of claim 1, wherein the custom action implements a fix of operations of the first scan engine.

15. The system of claim 1, wherein the interceptor is configured to receive configuration information via a graphical user interface (GUI), the configuration information specifying the traffic trigger and the custom action.

16. A method comprising:
    executing a first scan engine on one or more first computer devices, including:
       sending requests over a network to a target application to perform application security testing on the target application, wherein responses from the target application are analyzed to identify one or more security vulnerabilities of the target application; and
    executing a second scan engine on one or more second computer devices, including:
       monitoring network traffic between the first scan engine and the target application;
       detecting that a traffic item in the network traffic satisfies a traffic trigger;
       in response to the detection:
          initiating execution of the custom action configured for the application security testing of the target application; and
          logging an indication of the execution of the custom action in an audit log,
       wherein the second scan engine implements an interceptor and the execution of the interceptor includes:
          intercepting and regenerating network traffic between the first scan engine and the target application; and
          intercepting network traffic among a group of application servers executing the target application and a group of scan engines testing the target application, wherein the group of scan engines includes scan engines of different versions.

17. The method of claim 16, wherein
    the second scan engine is configurable via a graphical user interface to perform the custom action.

18. The method of claim 16, further comprising the second scan engine:
    continuing to update the audit log after a termination of the first scan engine prior to completion of the application security test.

19. The method of claim 16, wherein the custom action replicates a new feature implemented by a later scan engine version after the first scan engine.

20. The method of claim 16, wherein the custom action implements a fix of operations of the first scan engine.

* * * * *